US007298056B2

(12) United States Patent
Gizara (10) Patent No.: US 7,298,056 B2
(45) Date of Patent: Nov. 20, 2007

(54) TURBINE-INTEGRATED HYDROFOIL (75) Inventor: Andrew Roman Gizara, Lake Forest, CA (US)

(73) Assignee: Integrated Power Technology Corporation, Lake Forest, CA (US)

( * ) Notice: Subject to any disclaimer, the term of this patent is extended or adjusted under 35 U.S.C. 154(b) by 98 days.

(21) Appl. No.: 11/162,177

(22) Filed: Aug. 31, 2005

(65) Prior Publication Data

US 2007/0046028 A1 Mar. 1, 2007

(51) Int. Cl.
*B63G 8/42* (2006.01)
(52) U.S. Cl. .......................... 290/54; 290/43; 114/244
(58) Field of Classification Search .................. 290/43, 290/44, 54, 55; 114/242, 244
See application file for complete search history.

(56) References Cited

U.S. PATENT DOCUMENTS

| | | | | | |
|---|---|---|---|---|---|
| 1,898,973 | A | * | 2/1933 | Lansing | 440/6 |
| 2,047,155 | A | * | 7/1936 | Rettman | 180/2.2 |
| 3,619,632 | A | * | 11/1971 | Labombarde | 290/43 |
| 3,999,499 | A | * | 12/1976 | Kitabayashi | 114/74 T |
| 4,102,291 | A | * | 7/1978 | Sebald | 114/244 |
| 4,335,093 | A | | 6/1982 | Salomon | |
| 4,371,346 | A | * | 2/1983 | Vidal | 440/8 |
| 5,027,735 | A | | 7/1991 | Labrador | |
| 6,192,821 | B1 | * | 2/2001 | Morales et al. | 114/343 |
| 6,497,593 | B1 | * | 12/2002 | Willis | 440/8 |

(Continued)

FOREIGN PATENT DOCUMENTS

GB 2286570 A 8/1995

(Continued)

OTHER PUBLICATIONS

International Search Report for PCT/US2006/033373, mailed on Jan. 22, 2007, in 11 pages.

*Primary Examiner*—Nicholas Ponomarenko
(74) *Attorney, Agent, or Firm*—Knobbe, Martens, Olson & Bear, LLP (57) ABSTRACT

A turbine integrated within a hydrofoil extracts energy from a free-flowing motive fluid. In the preferred embodiment, the turbine is of the crossflow variety with runner blades coaxial to the width of the hydrofoil. The foremost edge of the hydrofoil comprises a slot covered by a continuously adjustable gate for controlling the overall drag imposed by the turbine. The hydrofoil mounts to a sailing vessel by means of a gimbal on a structure affixed to the hull, enabling the turbine to optimally respond to changes in direction of the free-flowing motive fluid and facilitating guidance and stability of the vessel. Both axes of the gimbal have a combination of auxiliary generator and motor with a locking mechanism. Engaging the motor and locking mechanism controls the guidance and stability of the overall vessel, and the pitch of the hydrofoil. Disengaging the locking mechanism and motor permits any change in direction of the motive fluid to affect the gimbal thereby extracting energy via the auxiliary generators. To further control drag and output power over a range of flow velocities, the preferred turbine comprises a DC generator with voltage feedback controlling field excitation, coupled to a voltage and current regulating circuit that performs electrolysis of water to produce hydrogen fuel. The hydrogen fuel tank also functions as the vessel's ballast having adjustable draft depending upon its fullness. Integrated remote control simultaneously optimizes vessel guidance, velocity, drag, stability, ballast depth, and electrolysis processes.

15 Claims, 5 Drawing Sheets

U.S. PATENT DOCUMENTS

| | | | |
|---|---|---|---|
| 6,508,191 B1 * | 1/2003 | Spoljaric | 114/244 |
| 7,146,918 B2 * | 12/2006 | Meller | 114/39.26 |
| 2003/0080245 A1 | 5/2003 | Greenberg | |
| 2003/0201645 A1 | 10/2003 | Pacheco | |

FOREIGN PATENT DOCUMENTS

| | | | |
|---|---|---|---|
| GB | 2365385 A | | 2/2002 |
| GB | 2388164 A | | 11/2003 |
| JP | 5-236698 | * | 9/1993 |

* cited by examiner

TURBINE-INTEGRATED HYDROFOIL

BACKGROUND OF THE INVENTION

1. Field of the Invention

The present invention is generally in the field of power plants. More specifically, the present invention is in the field of hydrokinetic generators with means to adapt to changes in streamline direction and magnitude of a free-flowing motive fluid. Most importantly, the present invention maximizes net energy by utilizing a hydrokinetic generator mounted on a marine sailing vessel that also limits drag on the vessel in a controlled manner.

2. Description of Prior Art

Considering present humankind's primary source of energy, fossil fuel can diminish to the point of negligible net energy within this century; there exists a fundamental need for developing renewable and sustainable sources of energy including further exploitation of readily available known resources. More specifically, there exists a need for a novel approach to ensure least impact to environment and low civic infrastructure costs such that the energy investment return is most quickly realized. Utmost, to optimally exploit oceanic energy, which may be attained anywhere over approximately three quarters of the surface of the planet thus availing vast industrial growth potential, the main obstacle existing is the delivery from such an expansive source of energy.

While many patents exist for harnessing energy from pneumatic and hydraulic sources, relatively few have considered a mobile structure to facilitate delivery of energy and maintenance and servicing of the structure. For instance, wind turbines mounted on abandoned off shore oil rigs, as well as both wind turbines and hydrokinetic turbines mounted on structures essentially resembling deep-sea buoys have begun to proliferate. These types of structures obviously do not adequately address delivery of energy considering their distance from the shore, the actual distribution center. These structures also impede maritime traffic and present maintenance difficulties especially in severe weather conditions. Another limitation of this prior art overcome by the present invention is that the density of water is approximately seven hundred seventy five times greater than air and thus a wind turbine must occupy an area seven hundred seventy five times greater than a hydrokinetic turbine in order to yield equivalent power given equal velocity of the motive fluids. The prior art structures utilizing hydrokinetic turbines yield power limited by the velocity of the motive fluid converted from wave motion alone. In contrast, a sailing vessel of limited drag may achieve velocities greater than the wind velocity thus illustrating one way in which the present invention optimally uses the advantages of combining hydraulic and pneumatic mediums. Even fewer patents so far have addressed the need to reduce drag caused by the mobile structure while engaged in the motive fluid.

The reduction of drag, the combined exploitation of hydraulic and pneumatic energy mediums, and the integration into a singular mobile combined generation and delivery system with means to optimally respond in a controlled manner to changes in velocities of the media exemplify the patentable novelty the present invention holds over prior art.

SUMMARY OF THE INVENTION

The present invention achieves the goals of overcoming existing limitations of prior art oceanic hydrokinetic and pneumatic power generation systems foremost through integration into a singular generation and delivery system to extract power from free-flowing seawater while simultaneously exploiting wind energy. While prior art exists which functions in free-flowing bodies of water or wind, the novelty of this invention lies in its ability to respond and adapt to any change in the magnitude and direction of the streamlines of plural free-flowing motive fluids while controlling drag caused by moving in any direction within the mediums of wind and water. Through implementing a system to control vessel velocity given input parameters such as wind velocity, seawater current velocity, vessel mass and drag affecting actual velocity of the vessel, and feedback of generator output voltages; this enables the present invention to extract optimal energy from both pneumatic and hydrokinetic sources. Controlling the drag also facilitates maintaining overall stability and guidance of the vessel.

Secondly, because developing an integrated generation and delivery system which optimally adapts to changes in both magnitude and direction of the streamlines of plural free-flowing motive fluids formed the basis of the guiding concepts of the present invention; this readily avails the present invention the applicability to any body of water anywhere. Thus, the present invention does not require a large scale of infrastructure and therefore greatly diminishes the environmental impact while attaining a positive net energy earlier upon implementation.

Optimizing energy efficiency in the control of all processes including drag, ballast depth, vessel stability and velocity, and electrolysis of water in an integrated control loop positions the present invention as desirable for implementation in gathering energy for emerging power conveyance systems, especially hydrogen fuel and fuel cell technology.

DETAILED DESCRIPTION OF THE INVENTION

The present invention is directed to a turbine-integrated hydrofoil for adaptively extracting energy from plural free-flowing motive fluids that continuously change direction and magnitude of flow. The following description contains specific information pertaining to various embodiments and implementations of the present invention. One skilled in the art will recognize that the present invention may be implemented in a manner different from that specifically depicted in the present specification. Furthermore, some of the specific details of the invention are not described in order to maintain brevity and to not obscure the invention. The specific details not described in the present specification are within the knowledge of a person of ordinary skills in the art. Obviously, some features of the present invention may be omitted or only partially implemented and remain well within the scope and spirit of the present invention.

The following drawings and their accompanying detailed description are directed as merely exemplary embodiments of the invention. To maintain brevity, some other embodiments of the invention that use the principles of the present invention are specifically described but are not specifically illustrated by the present drawings, and are not meant to exhaustively depict all possible embodiments within the scope and spirit of the present invention.

Figure 1:
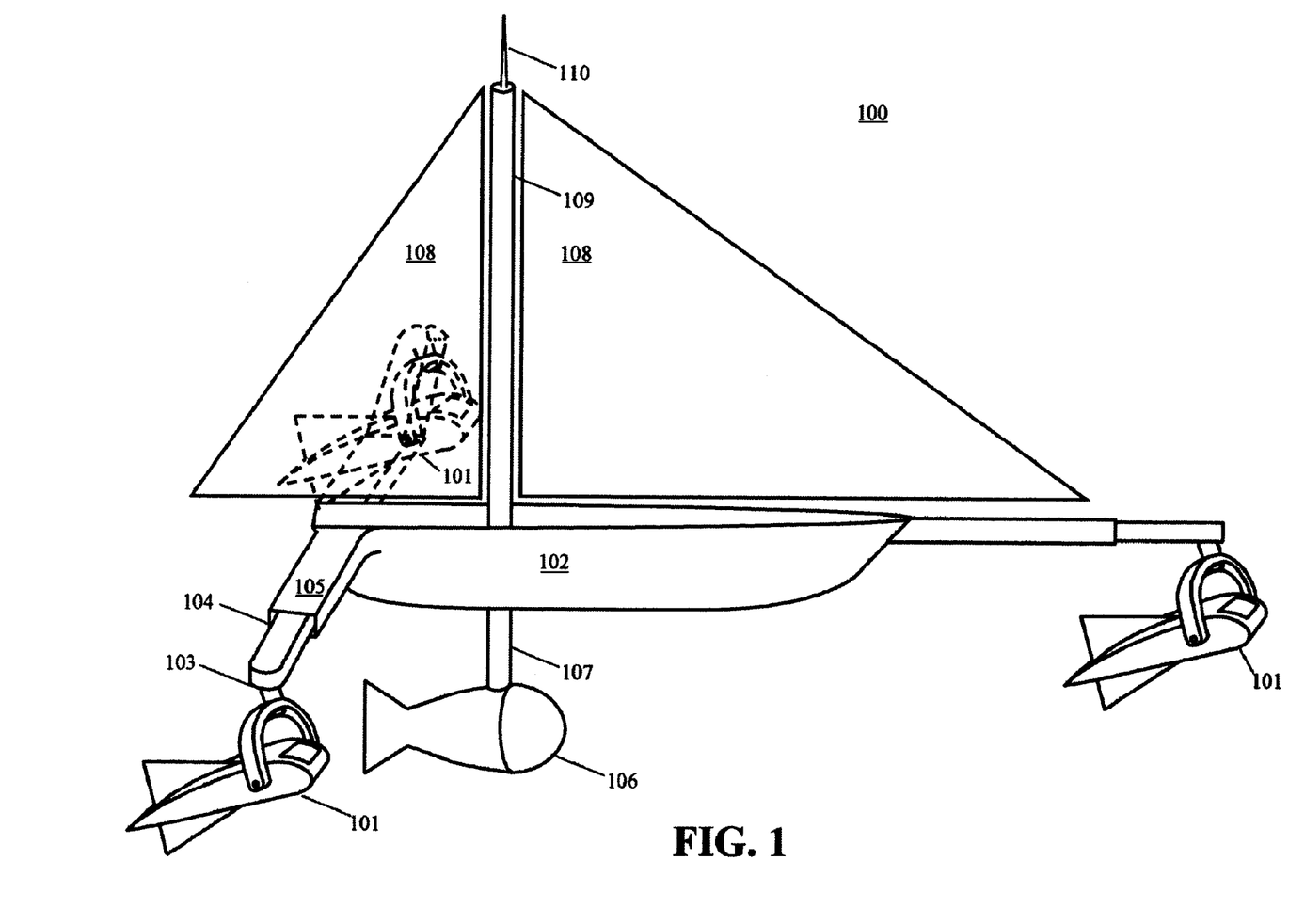
FIG. 1 illustrates a general perspective view of a vessel implementing an exemplary apparatus in accordance with a preferred embodiment of the present invention.

FIG. 1 illustrates a general perspective view of a vessel 100 implementing an exemplary apparatus in accordance with one preferred embodiment of the present invention. FIG. 1 depicts three turbine-integrated hydrofoils 101 engaged in the direction of the vessel 100. The present invention may implement any number of a plurality of turbine-integrated hydrofoils 101. The turbine-integrated hydrofoils 101 couple to the vessel 100 through corresponding beams 105 affixed to the hull 102 of the vessel 100. FIG. 1 portrays a single hull 102 although implementation of a multi-hull structure does not constitute a substantial departure beyond the scope of the present invention. A design of adequate buoyancy of the turbine-integrated hydrofoil 101 may supersede the implementation of any hull whatsoever. Further description of means of buoyancy within the turbine-integrated hydrofoil 101 and of an alternate shape of the hull 102 follows in subsequent paragraphs, FIG. 2, and FIG. 6. The length of beam 105 may extend to varying distances from the vessel's center of gravity through variable extension means 104 depending upon the velocity and stability of the vessel 100. The variable extension means 104 may vary in length through a controlled stabilizing locking motor mechanism not shown, or through a hydraulic piston-driven turbine system not shown. The hydraulic piston driven turbine system extracts supplemental energy from the tension and compression forces on the variable extension means 104 when drag varies from one hydrofoil 101 to the next during a vessel 100 stabilizing process engaging plural turbine-integrated hydrofoils 101. The beam 105 terminates at the gimbal mounting means 103 further described in a subsequent paragraph and in FIG. 3. Below the waterline, the output fuel tank 106 affixes to the hull 102 through variable extension means 107 which varies the draft of the output fuel tank 106 by varying extension length depending upon vessel velocity and stability, and mass of the output fuel tank 106 affected by fullness thereby providing ballast. Sails 108 provide the ordinary means of extracting energy from pneumatic sources. Because the hydrofoils 101 mount upon a beam extension means 104 of variable length, the sails 108, while not necessarily drawn to scale in FIG. 1, may significantly exceed the typical area of a sail for a vessel of a given hull size as depicted in FIG. 1. Furthermore, implementation of any area and material type for the sail 108 not explicitly addressed herein does not constitute a departure beyond the scope of the present invention. The mainmast 109 affixes the sail 108 employing means typically practiced in the art, though once again, due to the additional stabilizing effect provided by the hydrofoil mount beam variable extension means 104, the mainmast 109 may significantly exceed the typical height of a mainmast 109 for a vessel of a given hull size as depicted in FIG. 1. A lightening rod 110 mounts atop the mainmast 109 in order to extract additional energy from electrical storm activity. Given a mainmast 109 extending to greater heights than typical mainmasts for a vessel of the depicted hull size, and also in order to extract optimal pneumatic and hydraulic energy the vessel 100 will plot a trajectory towards maximal weather conditions likely including electrical activity, the present invention thus extracts further energy through lightening strikes to the lightening rod 110.

Figure 2:
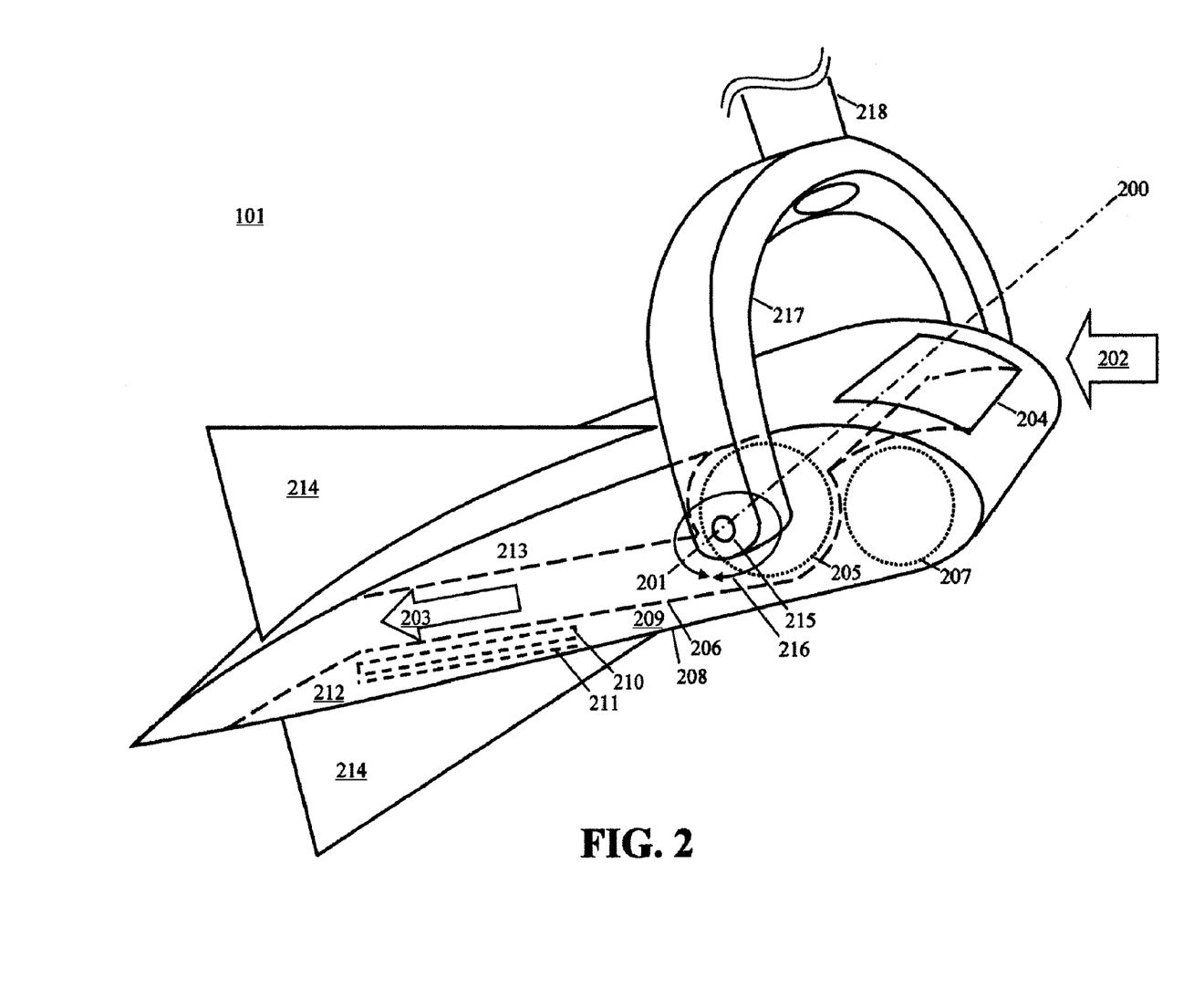
FIG. 2 illustrates a perspective detailed view of a turbine-integrated hydrofoil according to the preferred embodiment of the present invention.

FIG. 2 illustrates a detailed perspective view of the turbine-integrated hydrofoil 101, which provides a fundamental and significant departure from prior art and considerable novelty in the present invention. The dashed line 200-201 represents the axis of rotation 216 of the entire assembly of the hydrofoil 101. To minimize undesired mechanical oscillatory motion 216 that reduces efficiency and induces stress, the dashed line traverses through the center of gravity of the turbine-integrated hydrofoil. The rotation means 215 likely comprises circular bearings and serves two purposes. First, directly coupled through motor and locking means not shown, the rotation means 215 can adjust the angle of pitch of the hydrofoil 101 to optimize dynamic lift for variable vessel 100 velocities. Secondly, once the locking means not shown coupled to the rotation means 215 disengages, the motor not shown coupled to the rotation means 215 may operate as a generator extracting supplemental energy from rotational motion 216 caused by changes in direction of the free-flowing motive fluid. One of ordinary skill in the art will readily recognize the rotation means 215 forms one axis of a gimbal, a second axis formed by the gimbal mounting means 103 depicted in FIG. 3 and described in a subsequent paragraph. The present invention thus adapts to any change in direction of the streamlines 202 of a free-flowing motive fluid.

FIG. 2 further shows the streamline 202 of the free-flowing motive fluid entering the gate 204 of the turbine-integrated hydrofoil 101, proceeding through the outline of the fluid coupler means 205, and changing in pressure and velocity as indicated by the streamline 203 in the draft section of the turbine of different size and shape than the entering streamline 202. In the preferred embodiment, the fluid coupler means 205 entails a cross-flow impeller design as depicted in FIG. 5 and described in a subsequent paragraph. As the flow passes through the fluid coupler means 205, it impinges upon the lower surface 206 of the draft section of the turbine whereupon the gate to the electrolyzer may be found. Both the turbine gate 204 and the electrolyzer gate on lower surface 206 are illustrated in detail in FIG. 4. The electrolyzer preferably sits in the area 209 between the lower surface 206 of the draft section of the turbine and the outer lower surface 208 of the hydrofoil 101 itself. One electrode 211 of plural electrodes and the electrolyzer membrane 210 are shown and further comprise temperature sensors not shown which in part determine the openness of the electrolyzer gate. By flowing from the input gate in area 209 through the exit gate in area 212, the motive fluid of the turbine also serves as electrolyte as well as forced convection cooling fluid for the electrolyzer membrane 210 and electrodes 211. The openness of the electrolyzer gate and the turbine gate 204 affects the overall drag of the hydrofoil 101, and thus besides electrolyzer membrane 210 and electrode 211 temperature, the drag, stability, and velocity of the vessel 100 represent input variables into the control algorithm for opening the electrolyzer gate and turbine gate 204. In the preferred embodiment, the anode electrode 211 is composed of, or plated with manganese dioxide to minimize the amount of sodium hypochloride, NaOCl, also known as sodium chloroxide or chlorine bleach that collects at the anode 211 while operating in salt water. Hydrogen gas output from the electrolyzer becomes sequestered in a storage tank 207 or in the area 213. The hydrogen gas further enhances buoyancy of the overall hydrofoil 101. Obviously, any change in position of gates or area that the electrolyzer occupies within the hydrofoil 101 in the preferred embodiment does not constitute a substantial departure beyond the scope of the invention.

Figure 3:
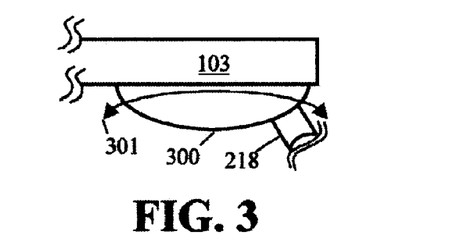
FIG. 3 illustrates a bottom view of the gimbal mounting means along the mounting beam for the turbine-integrated hydrofoil in FIG. 2 according to a preferred embodiment of the present invention.

The remaining features depicted in FIG. 2 include the external fins 214, and the support brace 217 directly coupled to the main strut 218. The main strut 218 directly couples to a rotating member 300 depicted in FIG. 3. FIG. 3 illustrates the rotational direction 301 allowed by the rotating member 300 affixed to the gimbal mounting means 103. As previously described for the primary axis, the rotating member 300 depicted in FIG. 3 affixed to the gimbal mounting means 103 forms the second axis of a gimbal. The rotating member 300 likely comprises circular bearings and serves two purposes. First, directly coupled through motor and locking means not shown, the rotating member 300 can adjust the angle of attack of the hydrofoil 101 and thus with the external fins 214 behaving as the keel board of the vessel 100, control guidance and stability of the vessel 100. Secondly, once the locking means not shown coupled to the rotating member 300 disengages, the motor not shown coupled to the rotating member 300 may operate as a generator extracting supplemental energy from rotational motion 301 caused by changes in direction of the free-flowing motive fluid impinging on the external fins 214. The present invention thus further adapts to any change in direction of the streamlines 202 of a free-flowing motive fluid. Let it further be known that given means to extract supplemental energy from the tension and compression forces on the variable extension means 104 and use of the external fins 214 and rotating member 300, the utilization of the vessel 100 in a body of free-flowing motive fluid of constant direction may entirely obviate a sail 108 and mainmast 109.

Figure 4:
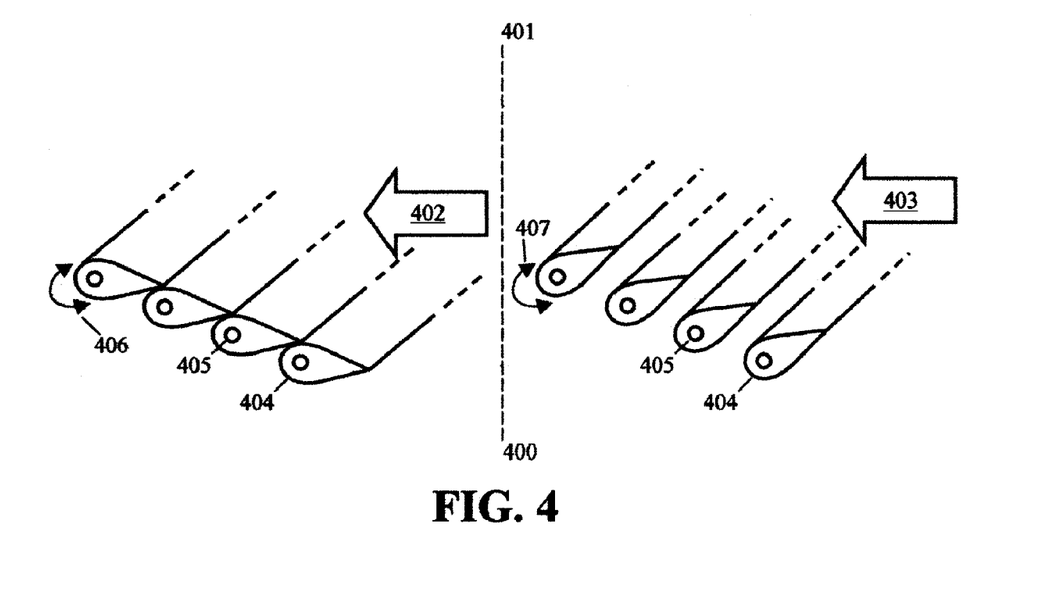
FIG. 4 illustrates a perspective cross-section view of two positions of the gate for the turbine or electrolyzer according to an embodiment of the present invention.
Figure 5:
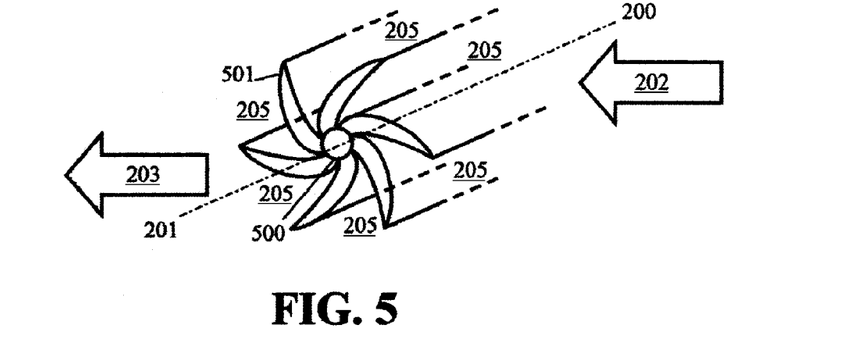
FIG. 5 illustrates a perspective view along the axis of the rotor, a cross section of an impeller with runner blades within the turbine according to a preferred embodiment of the present invention.
Figure 8:
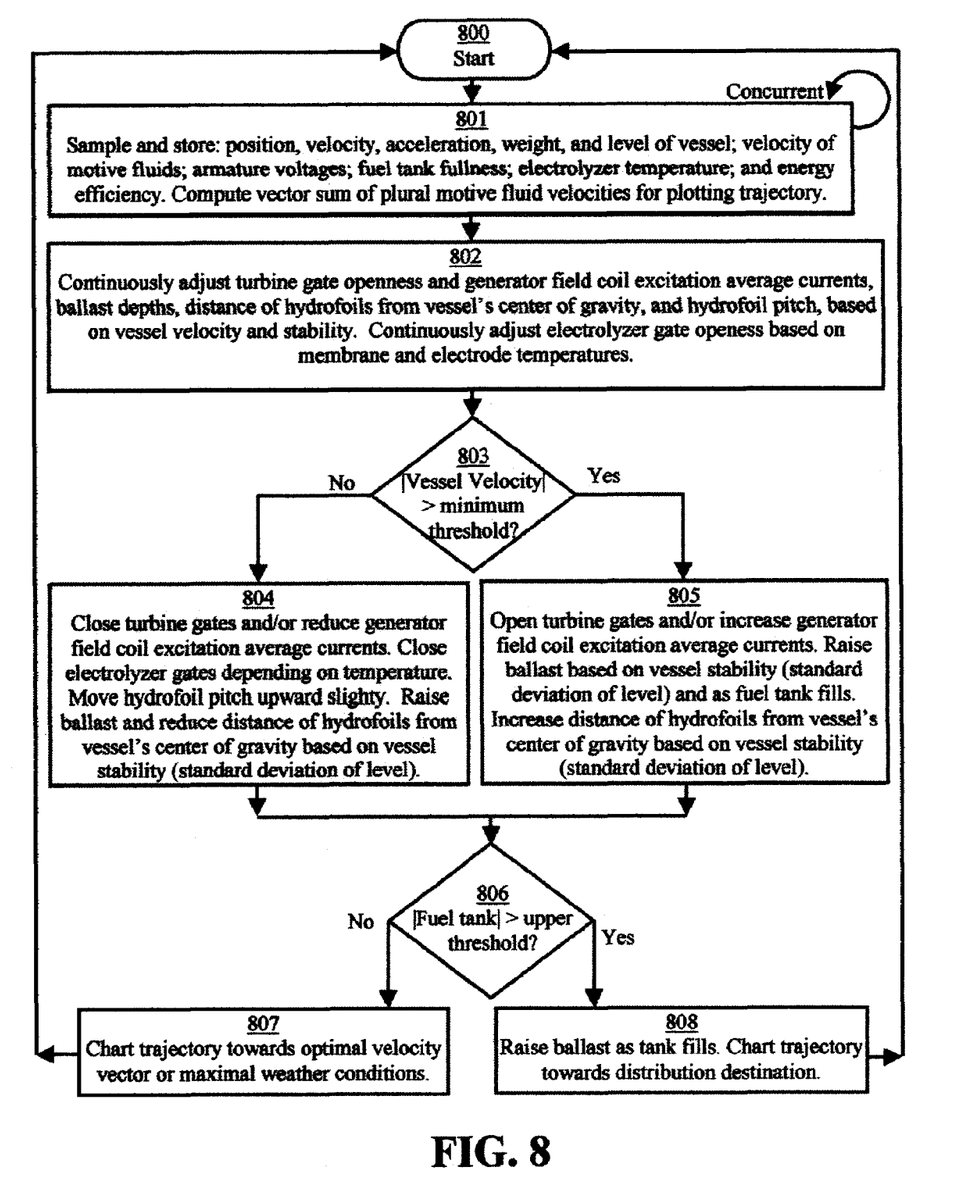
FIG. 8 illustrates the flowchart for control of the complete system according to a preferred embodiment of the present invention.

FIG. 4 illustrates two positions of a suitable embodiment of a mechanism for the gate to the electrolyzer or the turbine itself. The left hand side of dashed line 400-401 portrays the view of the gate in a closed position while the right hand side of dashed line 400-401 portrays the view of the gate in the open position. The arrows 402, 403 indicate the streamline of either the free flowing motive fluid 202 impinging on the turbine-integrated hydrofoil 101 itself, or the motive fluid 203 passing the gate of the electrolyzer on the lower surface 206 in the draft section of the turbine. Arrow 402 implies flow passing unabated over the closed gate whereas arrow 403 implies partially diverting flow inward while passing over an open gate. The blades 404 of the gate rotate synchronously upon an axis 405 depending upon the required adjustment. Arrow 406 indicates a closed gate adjusting to a more open position while arrow 407 indicates an open gate adjusting to a more closed position. FIG. 8 and subsequent paragraphs furnish further detail into the algorithm that determines the openness of each respective gate. While the gate mechanism presented in this specification likely provides adequate if not optimal functionality, the use of any other gating means not explicitly described herein does not constitute a substantial departure beyond the scope of the present invention.

FIG. 5 illustrates a perspective view of a fluid coupler, a cross-flow impeller looking along the axis of the rotor within the turbine. Dashed line 200-201 indicates the axis of rotation as stated before and viewed in FIG. 2 where the outline area of the fluid coupler 205 first became manifest. Here FIG. 5 shows a cross-sectional view of the rotor 500 as motive fluid 202 passes over the plurality of runner blades 501 to finally exit as draft flow 203 after depositing most energy in the form of both impulse force impinging upon the blade 501 and reactive force when leaving the blade 501. As this curved form of cross-flow impeller is well known within the public domain as derived from the Pelton water wheel concept for optimal energy extraction, the specification herein thus requires no further description. In light of the aforementioned, the modification of Pelton runner blades in the preferred embodiment is purely exemplary, illustrative and not restrictive. As previously stated, the fundamental goal of the present invention is to attain the highest possible net energy, in other words, highest return on investment in terms of energy, through implementing the simplest design. While the impeller herein presented likely provides optimal functionality, let it hereafter be known that any impeller, whether or not responsive to impulse and reaction forces, within a turbine-integrated hydrofoil responding to changes in direction and magnitude of the streamlines of a free-flowing motive fluid does not constitute a substantial departure beyond the scope of the present invention.

Figure 6:
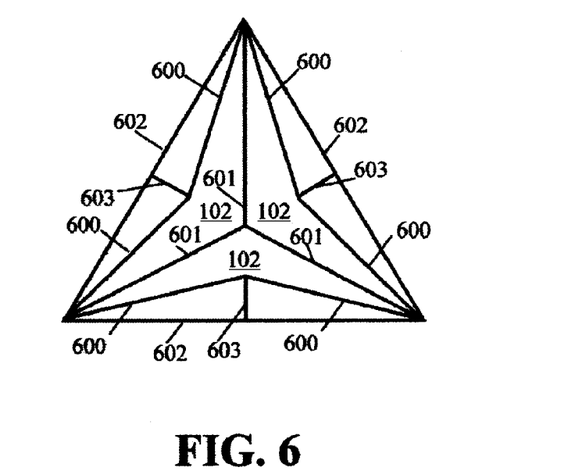
FIG. 6 illustrates a top-downward view of the outline of the hull and mounting of the vessel according to an alternate embodiment of the present invention.

This specification now refers to FIG. 6, a top-downward view of the outline of an alternate embodiment of the hull and mounting system. As previously stated, the vessel 100 may possess a single hull or a multiple hull structure, or no hull whatsoever given adequate buoyancy of the turbine-integrated hydrofoil 101. The outline of the hull 102, indicated by lines 600 in FIG. 6 represents a most agile structure for maneuverability, guidance and adaptation to changes in direction of pneumatic and hydraulic motive fluids given the gimbal mounting means 103 previously described for the turbine-integrated hydrofoil 101. The line 601 represents the keel board of the hull, mainly shown to clarify the view of the structure of the hull 102 in FIG. 6, which otherwise serves no practical purpose given the external fins 214 of the turbine-integrated hydrofoil 101 depicted in FIG. 2. Lines 602 and 603 represent alternate embodiments of the beams 105 and variable extension means 104 previously described. Line 603 thus represents a pinion member acting upon a rack gear in the middle of line 602 to increase or decrease the length of lines 602. Increasing the length of any singular line 602 increases the area of the triangle 602 formed by plural lines 602, thus moving the gimbal mounting means 103 of the turbine-integrated hydrofoil 101 located at the vertices of the triangle 602 away from the center of gravity of the vessel 100. The pinion member represented by line 603 possesses the same features and characteristics of the variable extension means 104 of FIG. 1 such as a locking motor mechanism or a generator when unlocked to extract supplemental energy when tension and compression forces act upon the variable extension means. One may note that multiple sides of the triangle formed by lines 602 must act synchronously, with one advantage being less stress to any one member due to distribution of forces among multiple members. Let it be know that the hull and mounting system presented in FIG. 1 and FIG. 6 in the preferred embodiment is purely exemplary, illustrative and not restrictive and any alternate hull and mounting system does not represent a significant departure beyond the scope of the present invention.

Figure 7:
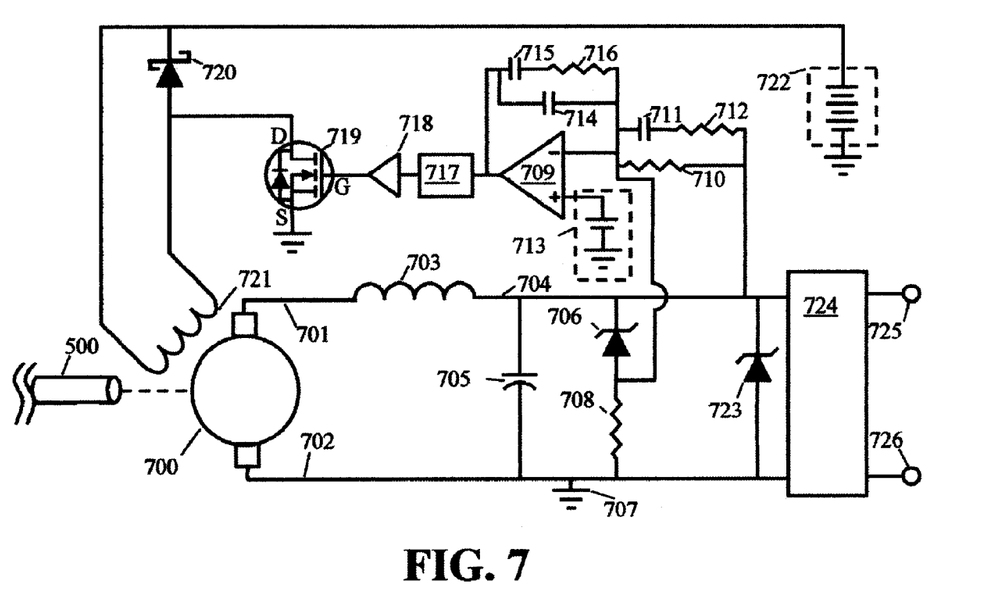
FIG. 7 represents a schematic view of a DC generator implementing switch mode field excitation directly coupled to the output shaft of the fluid coupler according to a preferred embodiment of the present invention.

FIG. 7 depicts a coupling configuration and energy extraction means from the impeller through to the output conditioning circuitry of the electric generator. FIG. 7 shows the generator rotor shaft 500 directly coupling to a DC generator 700. The DC generator 700 may also function as a motor by means of reversing armature current and with the use of the external fins 214 and rotating member 300, may enable guidance and stability of the vessel 100. The impeller, not shown in FIG. 7 in order to maintain simplicity, physically occupies the outline area 205 within the turbine-integrated hydrofoil 101, while the shaft 500 extends along the axis of rotation, line 200-201 as depicted in FIG. 2 and FIG. 5. The DC generator 700 may be any of available forms of DC generator, including but not limited to a commutated or semiconductor-rectified generator, and as shown with a separately-excited or else preferably with a self-excited shunt field winding 721 configuration chosen for its combined simplicity and relatively constant voltage independent of load current. The DC generator 700 thus produces a speed-dependent DC voltage across its armature leads, positive 701 and negative 702, that feeds the power filtering elements, the inductor 703 and the capacitor 705. Though two armature leads 701, 702 imply a single-phase machine, this is purely exemplary, and no predetermination is placed on the number of phases of the machine in the preferred embodiment. The filtering performed by the inductor 703 and the capacitor 705 minimizes spurs in the electrical waveform caused by commutation. The preferred embodiment of this invention samples the filtered DC waveform at node 704 filtered by inductor 703 and capacitor 705 referencing the negative armature lead 702 to local ground 707 to form feedback that controls the average current through the field winding 721. The feedback that controls the average field winding 721 current thus controls the torque opposing the impeller rotation thus controlling drag of the vessel 100 and ultimately the armature voltage depending on impeller rotational velocity and load current.

As previously mentioned, this form of feedback regulation allows relative scaling of mechanical parameters such as openness of the turbine gate 204 affecting vessel 100 drag in a coarse manner, ultimately affecting the power extractable for given pneumatic and hydraulic motive fluid energy levels. For power output means that draw a constant load current, this feedback control of field winding current can compensate for fine, instantaneous variation in the velocity and pressure of the free-flowing motive fluid 202 to produce a relatively constant armature voltage. This feedback control can also most quickly respond accordingly to changes in the free-flowing motive fluid 202 that impart varying levels of torque on the impeller affecting vessel 100 drag in a fine manner and thus avert potentially fatigue-inducing torque on the impeller during extreme conditions characterized by bow breaching and plunging motion imparting varying force on the turbine-integrated hydrofoil 101. For instance, when the average voltage of the sampled, filtered DC waveform at node 704 exceeds a given threshold, the feedback control will reduce the average current passing through the field coil 721 which in turn, reduces the torque on the impeller while reducing the average armature voltage. Likewise, when the average voltage of the sampled, filtered DC waveform at node 704 recedes below a given threshold, the feedback control increases the average current passing through the field coil 721, which in turn, increases the torque on the impeller for the benefit of increasing the average armature voltage. While load or armature current, i.e. the electrical current leaving the filtered node 704 and entering the output power conditioning means 724 may vary, responding to load current change may take a subordinate priority compared to responding to changes in motive fluid 202 pressure in order to avert fatigue on the impeller. In one case, an increase in extractable energy from the free-flowing motive fluid 202 or relative velocity of the vessel 100 coincides with an increase in demand for load current, therefore necessitating little change in average current passing through the field coil 721. Similarly, a decrease in extractable energy or relative velocity of the vessel 100 from the free-flowing motive fluid 202 coincides satisfactorily with a decrease in demand for load current again necessitating little change in average current drawn through the field coil 721. However, given the extractable energy from the free-flowing motive fluid 202 increases or decreases contrary to a decrease or increase in demand for load current, these situations can elicit limitations in the control loop response. These limitations may manifest in terms of delayed response time, that is, control loop parameters such as loop bandwidth and damping factor that primarily concern stability may slow a response time, producing inadequate transient output voltage or else excessive transient output voltage given a lesser bandwidth or incorrect damping factor. In addition, the design must take into careful consideration the overall headroom for meeting system demands during such instances, and thus varying loads require more design complexity. Therefore the preferred embodiment of this invention powers output means drawing constant current for optimal power conditioning for application to loads such as an electrolyzer, with the relative velocity of the vessel 100 also an input parameter in the overall control loop for the complete system as described in subsequent paragraphs and FIG. 8.

Proceeding further along the path of the local feedback loop, FIG. 7 depicts two points on the filtered node 704 where sampling occurs. The path including the resistors 710, 712 and the capacitor 711 constitute the voltage sampling node of a typical feedback loop with frequency compensation. The network of these resistors 710, 712 and the capacitor 711 along with the error amplifier 709 and its own feedback loop represented by the capacitors 714, 715 and the resistor 716 form the feedback section of a prior art switch mode power supply. Given the fixed internal reference voltage 713 into the non-inverting input of the error amplifier 709, resistor 710 along with resistor 708 compose a voltage divider that sets the optimal voltage on the filtered node 704 that feeds the output power conditioning means 724 while this control loop responds to variations in the velocity of the motive fluid 202. The reference voltage 713 multiplied by the quantity of one plus the ratio of resistor 710 over resistor 708 determines the optimal value of the output voltage of the filtered node 704 that the control loop maintains despite changes in input energy. The other sampling node includes the Zener diode 706 that quickens the response to over-voltage conditions at the sampling node 704. Resistor 708 must be of correct value in order to allow the Zener current to flow through the diode 708 given this over-voltage condition. The design of the frequency compensation of this error amplifier must also take into account the junction capacitance, though often negligibly small, seen across the Zener diode 706 and parallel to resistor 710. Resistors 712 and 716 and capacitors 711, 714, 715 form the frequency compensation of the error amplifier 709 within the feedback loop of a prior art switch mode power supply.

While tuning these frequency compensation components is not germane to the specification of the present invention and is elsewhere covered in detail, this specification will now disclose some general observations regarding it. Uncompensated, the filter components, the inductor 703 and the capacitor 705 produce a complex pole pair at their resonant frequency given by one over the quantity of two times pi times the square root of inductance times the capacitance. The filter capacitor 705 also places a zero above the pair of poles at a frequency given by one over the quantity of two times pi times the capacitance and the value of the capacitor's 705 equivalent series resistance, "ESR". Generally as a goal in compensation, two zeroes are added near the filter resonant frequency to correct the sharp change in phase near that frequency and an open-loop unity gain frequency is chosen to exist at a frequency about ten times greater than the resonant frequency but less than about 10% of the switching frequency. The overall gain of the error amplifier 709, the filter components comprising the inductor 703 and capacitor 705, the two zeroes added plus the gain of the integrator created by the compensation network that sets open-loop unity gain frequency preferably sums to zero at the unity gain frequency. The integrator gain is given by $1/(2(\text{pi})(F_o)(R710(C714+C715)))$ where Fo is the open-loop unity gain frequency. The frequency of the output filter compensating zeroes equals $1/(2(\text{pi})(R716)(C715))$ and $1/(2(\text{pi})(R710+R712)(C711))$ and these zeroes are understood to add to 40 dB per decade of gain. A pole also exists in the compensation network and its frequency is chosen to coincide with the zero formed by the output capacitor 705 and its equivalent series resistance "ESR". This compensating pole frequency equals $1/(2(\text{pi})(R712)(C711))$. A final pole in the compensation network exists at the frequency $1/(2(\text{pi})(R716)(C714\|C715))$ and is selected to be about ¾ Fs, three-quarters of the switching frequency to reduce switching noise into the error amplifier 709. While it is understood the precise placement of the pole frequencies, integrator frequency and zeroes frequencies is not of utmost criticality, care must still be taken to follow the aforementioned feedback loop frequency compensation practices to yield best power supply response and stability, and particularly a relatively constant output voltage 704 over the widely varying angular velocity of the rotor 500 resulting from the wide variation of energy within the free-flowing motive fluid. In the past, stability problems have risen due to a negative resistance oscillator formed by cascading switch mode power supplies. For example, the second switch mode power supply in FIG. 7, the output power conditioning means 724, presents a negative resistance because its input current actually decreases with increased input voltage, which in turn may cause instability by adding right-hand s-plane poles in the characteristic equation of the control loop. To prevent this form of instability, the design must ensure the magnitude of the complex impedance of the source, i.e. the DC generator 700 along with the power filtering elements, the inductor 703 and the capacitor 705, is much less than the magnitude of the input impedance of the output power conditioning means 724 over the entire frequency band of interest, from DC to the unity gain frequency of the feedback loop of the output conditioning means 724. Careful consideration to all the aforementioned stability criteria ensures long-term reliability and optimal energy extraction over the widest possible range of velocity of the motive fluid 202.

Proceeding further along the feedback path depicted in FIG. 7, after the error amplifier 709, a pulse width modulation or pulse frequency modulation controller 717 exists primarily to convert the analog error signal output of the error amplifier 709 into pulses which, after getting conditioned to source and sink large impulses of current by the gate driver buffer 718, drive the gate of the field coil current switching field effect transistor 719, ultimately determining the average current drawn through the field winding 721 of the DC generator 700. The design of the pulse width modulation or pulse frequency modulation controller 717 preferably implements an analog comparator, not shown, that sets and resets logic according to the value of the sampled voltage 704 compared to a fixed reference. In this case, the analog comparator, not shown within block 717, receives at its inverting input, the voltage signal output from the error amplifier 709. The non-inverting input of the analog comparator, not shown, receives a DC voltage signal equal to that of the voltage reference 713, in the same manner as the error amplifier 709. The analog comparator within the pulse width modulation or pulse frequency modulation controller 717 thus compares the inverted output of the error amplifier 709 to a voltage equal to DC reference 713. Since the comparator within the pulse width modulation or pulse frequency modulation controller 717 is an inverting amplifier referenced to the voltage reference 713, the filtered output voltage 704 once divided by resistors 710, 708 gets inverted through the error amplifier 709, and this output gets inverted by this comparator. Therefore, the comparator output within the pulse width modulation or pulse frequency modulation controller 717 is a logic high signal when the filtered output voltage 704 is above the set voltage and a logic low signal when the filtered output voltage 704 is below the set voltage. This comparator output logic signal is routed out through logic means that finally inverts the signal into the gate driver 718. Thus when the filtered output voltage 704 exceeds the set voltage, the logic means resets and along with the output of the modulation controller 717 and inputs to the gate driver 718, goes low, disabling current flow through the field coil current switching transistor 719. The logic means within the pulse width modulation or pulse frequency modulation controller 717 preferably permits the controller 717 to operate in an energy saving "pulse skip" mode. When the output voltage 704 exceeds the set voltage, skipping pulses saves the energy needed to charge and discharge the gate of the field coil current switching transistor 719. As previously stated, the relative velocity of the vessel 100 presents an input parameter in the overall control of the vessel 100. Here in the pulse width modulation or pulse frequency modulation controller 717, the input parameter of vessel 100 relative velocity may induce pulse skip operation. When the relative velocity of the vessel 100 recedes below a given threshold, the pulse width modulation or pulse frequency modulation controller 717 may thereby minimize energy lost in field coil 721 current as well as reduce drag on the vessel 100. Let it hereafter be known that this means of controlling the average field coil current using switch mode techniques is strictly exemplary and not restrictive, and therefore any changes in configuration, such as but not limited to, choice of pulse width versus pulse frequency modulation, or the polarity of the output logic and according choice of N-type or P-type channel material of the field coil current switching transistor 719, does not constitute a substantial departure beyond the scope and spirit of the present invention.

While FIG. 7 depicts a separately excited field coil as the means of field coil excitation, a self-excited shunt field winding likely proves equally effective, if not more readily realizable due to the amount of current passing through the coil and convenience of not needing the physical space a separate supply 722 occupies. Note that while FIG. 7 also depicts the catch rectifier 720 as a Schottky diode, that a synchronized switching transistor may be implemented in its place at the expense of greater complexity in the logic of the controller 717 and an additional gate driving buffer similar to gate driver buffer 718 but for the benefit of increased power efficiency. As well known by those skilled in the art, because the field coil 721 is inductive, when the current is switched, the field coil voltage is reversed proportional to the inductance multiplied by the change in current with respect to time. Using a simple catch rectifier 720 can protect the switching transistor 719 from over voltage while feeding that stored energy back to recharge the separately excited field winding source 722 or back into the armature terminal 701 in the case of a self-excited shunt field winding, thereby returning the stored energy in the field coil 721 back to the system, increasing the system power efficiency. A synchronous switching rectifier that has a lower voltage drop across it depending upon drain to source on-resistance and rectifying current compared to the catch rectifier 720 gains further efficiency. The complexity of the synchronous rectifier lies in the precision required to prevent the field coil current switching transistor 719 including its gate capacitance from having an on-time that coincides with the on-time of the transistor including its gate capacitance that replaces the catch diode 720. Having on-times that coincide effectively short-circuits the field winding leads and thus short-circuits the field winding excitation source. Conversely, the longer delay in turning-on the synchronous rectifying transistor reduces the gain in efficiency. Digital timing circuitry within the controller 717 may achieve the goal of precise timing necessary, given a known tolerance for the gate capacitances of the switching transistors. Whether the system of controlling average field coil current implements a simple catch diode or a synchronous rectification circuit, both circuits remain within the scope of the present invention.

While this specification previously presented a chopped field coil current controlled DC generator as the preferred embodiment, equivalent generator configurations exist within the scope of the present invention. In one embodiment, the generator 700 alternatively exists as an AC induction generator of adequate number of poles such that its synchronous speed, which determines whether the AC machine is operating in its generator or motor region according to its torque-slip curve and is inversely proportional to the number of poles, is well below the average rotational velocity of the rotor 500 and therefore the AC machine operates with positive slip as a generator. What makes the AC induction generator desirable is its economical, reliable construction and widespread use, rendering this type of generator easily attainable and cost effective. In the case of unavailability of an AC induction generator of sufficient number of poles for an adequately low synchronous speed to operate with positive slip given the average rotational velocity of the rotor 500, the AC induction generator indirectly couples to the impeller through a gear system. This gear system increases the rotational velocity of the rotor shaft 500 with respect to the impeller. The gear system likely occupies the outline area of the fluid coupler 205 in proximity to the generator 700. In order to directly apply the voltage from the AC induction generator to the load through wires 725, 726, the electrical circuit represented by output conditioning means 724 contains a speed dependent switch that receives an input signal from a velocity transducer sensing the rotation of the rotor 500 in the outline area of the fluid coupler 205. The velocity transducer output signal therefore also needs to physically traverse the same path as the leads 701, 702 either on its own conductor or modulated upon the armature coil power current. This speed dependent switch affords highest efficiency and protection such as when the coupler shaft has inadequate velocity for positive slip, or there exists a fault condition on either side of the output conditioning means 724, the AC generator becomes disconnected from the load. This gear system including automatic transmission to change the impeller to rotor gear ratio to achieve constant output voltage amplitude over varying fluid velocities, rotational velocity transducer, and speed dependent switch effectively replaces the filtering components 703, 705, and the entire field current controlling feedback loop of the previously described DC generator system. The output conditioning means 724 could thus be physically located in the hull 102 away from the generator unit, with the leads 701, 702, routed from the generator 700, through the support structure 217, 218, 103, out along the beam 105 through the extension means 104 to the hull 102 location of the output conditioning means 724. As with the leads before, the output conditioning means 724, though only a pair of wires 725, 726 is shown implying a single-phase system, this is purely exemplary with no predetermination of the number of phases that may be applied to the utility power grid.

Returning to the DC generator implementation, a variety of loads may be applied by connection to the leads 702, 704 depending upon end user needs. Examples of loads include charging any variety of available chemistries of battery, or the leads 725 and 726 themselves terminating as the electrodes in the process of electrolysis of water to produce hydrogen fuel. In both cases here, the output means 724 will likely require the protection of the transient voltage suppressor 723, shown in FIG. 7 as a Zener diode, from inductive spikes caused by commutation. Here in these examples of output loads as in all foregoing descriptions, the local ground 707 attached to lead 702 purely references the negative differential voltage output of the generator 700 and all other associated references in the field coil current controlling feedback system, not ordinarily referenced to true earth ground and thus not the chassis ground potential of the turbine-integrated hydrofoil 101 and for that matter, quite likely completely isolated from the negative differential voltage lead 726 from the output power conditioning means 724 which may or may not be referenced to a true earth ground potential.

In the case of the load being the charging batteries, the output conditioning means 724 could occupy a physical location within the turbine-integrated hydrofoil 101 in the instance of the battery being the excitation source 722 for another DC generator 700. But in other applications, because the process of battery charging generally requires low-error voltage sensing at the battery terminals and low-error temperature sensing from a thermistor within the cell packaging powered by an accurate reference, the design more feasibly and economically locates the charger section of the output power conditioning means 724 in proximity of the battery unit charging in the hull 102. Therefore the leads 725, 726 likely route high voltage from the output power conditioning means 724, through the support structure 217, 218,103, out along the beam 105 through the extension means 104 to the hull 102 location of the battery and associated charger.

In the preferred embodiment, the load is the current required to perform electrolysis on water to produce hydrogen fuel. This process achieves a high efficiency due to inherent advantages in the preferred embodiment of the present invention. Seawater is naturally electrolytic thereby reducing chemical processing costs; and advanced electrolysis methods allow for a voltage as little as one and a half to two volts applied across the electrodes, which the generator 700 in the self-excited shunt field winding configuration can easily provide over a wide range of rotational velocities of the rotor 500. Given the requirements for such a system for electrolysis, the output conditioning means 724 in one case consists of simply a very high efficiency synchronous switch mode buck or in other words, step-down DC-to-DC converter, with some form of current regulation, to provide the appropriate voltage to the electrodes 725, 726 to perform electrolysis. In this case, synchronous switch-mode DC-DC conversion cannot provide isolation of the local ground 707 from true earth ground, which may or may not be tolerable for the configuration of DC generator 700 implemented, though desirable due to its simplicity and optimal efficiency. If the DC generator 700 absolutely requires ground isolation, then a flyback or forward DC-DC converter with synchronous rectification within the output power conditioning means 724 achieves the next highest efficiency. Because this output power conditioning means 724 is relatively simple and compact, it can occupy an area adjacent to the generator 700 within the turbine-integrated hydrofoil 101, with the leads 725, 726 routing conditioned DC power to the electrodes contained within the appropriate sections of the electrolyzer. For simplicity, the system preferably reduces wire losses by minimum distance routing a low voltage and high current through copper bars 725, 726 to the electrolyzer where the power is then directly applied to the electrodes 211. The leads 725, 726 terminate as the electrodes, particularly the anode and cathode, respectively, for the electrolyzer, and thus the anode 725 references to true earth ground as the hydrogen collects at the cathode 726 while the system isolates both the gas and electrical potential at the cathode 726 from the surrounding environment. One means of using seawater for hydrogen electrolysis consists of admitting seawater through a filter membrane in a reverse osmosis process for desalination then adding potassium hydroxide as an electrolyte for increased electrolyzer efficiency. In the preferred means, the filter membrane is coarse enough to allow seawater with salt less the silica particulate, and the anode 725 is plated with manganese dioxide to minimize the amount of sodium hypochloride, NaOCl, also known as sodium chloroxide or bleach that collects at the anode 725. This preferred electrolysis method saves the cost in energy to perform reverse osmosis desalination and processing the sodium chloroxide by-product otherwise an environmental contaminant.

Alternately, the output power conditioning means 724 may take the AC voltage produced by an AC induction generator in place of the DC generator 700 from leads 701, 702 and full-wave rectify the AC voltage into a DC voltage, then filter and further regulate the voltage and current for optimal power conditioning for application to loads as described in the foregoing paragraphs regarding DC power generation.

FIG. 8 illustrates the overall control of all the components described thus far of the complete turbine-integrated hydrofoil for adaptively extracting energy from a free-flowing motive fluid that continuously changes direction and magnitude of flow. While FIG. 8 displays a flowchart, which is ordinarily associated with a computer program running in software, the algorithm delineated may be implemented with any combination of hardware or software such as linear or analog circuits or discrete digital circuits or an integrated central processing unit, or a microprocessor. A central processing unit or microprocessor affords the advantage of convenient means to gauge, test, and remotely communicate using well-defined existing wireless standards to a central service logging and energy distribution location, the state of any part or process of the system, including but not limited to functionality, guidance, stability, drag, velocity, or fullness of batteries or hydrogen fuel tanks. Furthermore, a local central processing unit or microprocessor may receive control signals guiding the vessel 100 towards maximal weather conditions from a remote control and service facility with means to track weather conditions. Such remote control means could permit unmanned operation of the vessel 100. From the start 800, the controller is continuously sampling and storing 801 such variables as position, velocity, acceleration, weight, and level of vessel; velocity of motive fluids; armature voltages; fuel tank fullness; electrolyzer temperature; and energy efficiency. From the sampling and storing 801 processes, the system control algorithm proceeds in two concurrent paths through the remainder of the flowchart. While not specifically stated in block 801, it may be assumed all sampled variables including the signals representing various input parameters including the armature voltage are sampled and stored in a likewise continuous, concurrent manner as implied by the looping arrow exiting only to return to the upper right corner of block 801. In the preferred embodiment, the period for sampling the motive fluids velocities has a time resolution necessary to react to and control mechanical processes, ordinarily sampling at an approximate frequency of about a hundred times a second, or a period of about ten milliseconds, with a small deviation allowable possibly due to the convenience of a local non-integer multiple frequency digital clock from which to derive this sampling clock frequency. This algorithm then averages the samples over a space of five to ten samples, this average representing a single sample in order to reduce the effects of noise. It is reasonable that the processes controlling motive fluid related adjustments such as turbine gate openness in block 802 need to occur, or most efficiently occur for that matter, no more often than ten to twenty times a second. The vector sum of plural motive fluid velocities is then computed to determine the vessel 100 trajectory to plot for optimal energy extraction by directing towards the highest relative vessel 100 velocity vector. This highest relative vessel 100 velocity vector then gets communicated back to a central remote control facility if implemented.

In practically all conceivable embodiments, there always exists the path that serves to adjust the field coil 721 current to optimize generator 700 armature voltage, while minimizing the necessary torque exerted on the impeller and drag on the vessel 100 over a range of relative velocities of the free-flowing motive fluid 202. Thus in the flowchart of FIG. 8, the path proceeds from the sampling block 801 to the process block 802, where the instantaneous magnitude of the sampled generator armature voltage is compared to an upper threshold. This upper threshold likely equals in excess of one hundred percent of, but less than two times, the rated voltage of the generator 700. Various types of circuits may perform this comparison through either digital sampling followed by numeric comparison or through analog means to control the average field coil 721 current such as the control feedback loop previously described with FIG. 7. Hence, the outcome of this comparison in block 802 determines whether to increase or decrease the average field current accordingly. Using means described previously and depicted algorithmically in FIG. 8, this block 802 exists to process the sampled instantaneous magnitude of the output voltage to determine the average field coil 721 excitation current by means of feedback control processes applied in order to optimally extract energy from a free-flowing motive fluid. If implemented digitally, the number of samples per second corresponding appropriately to slightly greater than two times the unity gain loop bandwidth previously described, defines the sampling period per the Nyquist criterion. This digital algorithm, like the preceding analog circuitry, allows the generator to produce a maximum voltage while mitigating the risk of fatigue upon the impeller 205 throughout the extremes of usable flow, while also minimizing drag on the vessel 100 throughout the range of vessel 100 relative velocities.

The previously described paths through the flowchart of FIG. 8 perform mathematical manipulations on sampled output voltages of sensors in order to determine the appropriate course of action. It shall be known that any of the paths could share the outputs of these mathematical functions in order to improve the overall control algorithm. The previously cited example of this refers to when the relative velocity of the vessel 100 recedes below a given threshold, the pulse width modulation or pulse frequency modulation controller 717 may skip pulses that determine the generator average field coil 721 excitation current to minimize energy lost in field coil 721 current as well as reduce drag on the vessel 100. FIG. 8 further shows by decision block 803 how the magnitude of vessel 100 relative velocity may feed into the control of most other processes. Block 804 deals with insufficient magnitude in vessel 100 velocity, whereby reduction in vessel 100 drag is in order to increase velocity, or minimize vessel 100 extreme instantaneous instability, hence reduce the average field coil 721 to reduce torque on the impeller 205 as well as close the turbine gate 204 and the gate to the electrolyzer depending upon temperature. Block 804 suggest two other means of reducing vessel 100 drag depending upon vessel 100 stability thereby increasing velocity including reducing the distance of the hydrofoil from the center of gravity of the vessel 100, along with lifting the ballast 106. Block 804 also suggests adjusting the pitch of the hydrofoil 101 to improve dynamic lift at the lower vessel 100 velocity. Block 805 deals with optimizing extractable energy once the vessel 100 attains sufficient velocity for the hydrofoils 101 to provide maximum dynamic lift. This action includes opening the turbine gates 204 and increasing the average field coil 721 excitation current resulting in increased armature voltage from the generators 700. Another input parameter into this block 805 comprises vessel 100 stability, consisting of a computed standard deviation of level over many samples as sensed by accelerometers, gyroscopes, camera-based pattern recognition means, or any other presently available inertial displacement sensing means. In block 805, vessel 100 stability and velocity form input parameters into control of distance of hydrofoils 101 from the center of gravity of the vessel 100 and control of ballast draft itself having a third input variable of fuel tank 106 fullness. Decision block 806 makes a high level decision affecting vessel 100 trajectory based on tank 106 fullness. If the tank fullness is below a given threshold as shown in block 807, the vessel 100 stays its present course towards maximal weather conditions or maximal relative velocity vector as computed in block 801. If the tank fullness appears above a given threshold, the vessel 100 should plot a trajectory back towards the central distribution destination to dock its payload, all the while adjusting ballast 106 draft according to aforementioned stability computations. While not explicitly depicted for sake of clarity in the flow diagram of FIG. 8, it may be inferred that any deviation of the algorithm to include the additional use of these function output variables in decision blocks, or for that matter, use of a singular central processor to also concurrently perform these and other control tasks not explicitly depicted, such as, but not limited to: charging batteries; or performing electrolysis; maximizing energy efficiency; or electronic means of vessel 100 velocity, drag, stability, or guidance control; or logging communications; does not constitute a substantial departure beyond the scope of the present invention.

From the detailed description above it is manifest that various implementations can use the concepts of the present invention without departing from its scope. Moreover, while the invention has been described with specific reference to certain embodiments, a person of ordinary skill in the art would recognize that significant alterations could be made in form and detail without departing from the spirit and the scope of the invention. The described embodiments are to be considered in all respects as illustrative and not restrictive. It shall also be understood that the invention is not limited to the particular embodiments described herein, but is capable of many rearrangements, modifications, omissions, and substitutions without departing from the scope of the invention.

Thus, a turbine-integrated hydrofoil for adaptively extracting energy from a free-flowing motive fluid that continuously changes direction and magnitude of flow has been described.

What is claimed is:

1. A sailing vessel comprising
   a hull;
   a housing coupled to the hull by a beam forming a hydrofoil configured to provide lift to the hull, the housing comprising:
   at least first and second openings configured to allow fluids to flow into the first opening and out of the second opening;
   a turbine;
   and a generator coupled to said turbine; wherein said turbine and generator are responsive to the fluids to generate power.

2. The sailing vessel of claim 1 wherein said turbine is a cross-flow turbine.

3. The sailing vessel of claim 1 further comprising leads configured to charge a battery.

4. The sailing vessel of claim 1 wherein said housing further comprises an electrolyzer for electrolyzing said fluid.

5. The sailing vessel of claim 4 wherein said housing further comprises a storage area configured to store hydrogen produced by the electrolyzer.

6. The sailing vessel of claim 4 wherein said electrolyzer comprises anodes comprised of manganese dioxide.

7. The sailing vessel of claim 1 wherein said housing further comprises a gate for adjusting the size of at least the first opening.

8. The sailing vessel of claim 1 further comprising a feedback system in communication with said generator, wherein said feedback system is configured to control the average field winding current to produce a constant voltage.

9. The sailing vessel of claim 1 further comprising a gimbal coupling said housing to said beam.

10. The sailing vessel of claim 9 wherein said beam is adjustably extendable.

11. The sailing vessel of claim 10 wherein said adjustably extendable beam comprises means of energy extraction from compression and tension forces acting upon said adjustably extendable beam.

12. The sailing vessel of claim 1 further comprising a mast comprising a lightning rod configured to store energy from lightning.

13. A sailing vessel comprising
- a hull;
- at least two housings coupled to the hull by beams forming a hydrofoil;
- at least one of said housings comprising:
    - at least first and second openings configured to allow fluids to flow into the first opening and out of the second opening;
    - a turbine; and
    - a generator coupled to said turbine; wherein said turbine and generator are responsive to the fluids to generate power.

14. The sailing vessel of claim 13, wherein at least one of said housings is coupled to the starboard side of the hull and at least one of said housings is coupled to the port side of the hull.

15. The sailing vessel of claim 13, wherein said housings provide lift to the hull during operation.

\* \* \* \* \*